United States Patent [19]

Maine et al.

[11] Patent Number: 4,864,517

[45] Date of Patent: Sep. 5, 1989

[54] GRAPHICS DISPLAY SYSTEM USING FRAME BUFFERS

[75] Inventors: Stephen Maine, Fort Salonga, N.Y.; Duncan Harrower, Fordingbridge, England; Abraham Mammen, Levittown, N.Y.

[73] Assignee: Computer Graphics Laboratories, Inc., Old Westbury, N.Y.

[21] Appl. No.: 169,070

[22] Filed: Mar. 15, 1988

Related U.S. Application Data

[63] Continuation of Ser. No. 740,832, Jun. 3, 1985, abandoned.

[51] Int. Cl.[4] ........................ G09G 1/16; G06F 15/626

[52] U.S. Cl. .................................... 364/521; 364/518; 340/725; 340/747

[58] Field of Search ................................ 364/518–522; 340/723, 724, 747, 725

[56] References Cited

U.S. PATENT DOCUMENTS

| | | | |
|---|---|---|---|
| 3,833,760 | 9/1974 | Tickle | 178/6.8 |
| 4,075,620 | 2/1978 | Passavant et al. | 364/521 |
| 4,189,743 | 2/1980 | Schure et al. | 358/93 |
| 4,189,744 | 2/1980 | Stern | 358/93 |
| 4,209,832 | 6/1980 | Gilham et al. | 340/721 |
| 4,232,211 | 11/1980 | Agneta | 340/703 |
| 4,317,114 | 11/1982 | Walker | 340/721 |
| 4,384,338 | 5/1983 | Bennett | 364/522 |
| 4,404,554 | 9/1983 | Tweedy, Jr. et al. | 340/801 |
| 4,412,294 | 10/1983 | Watts et al. | 364/518 |
| 4,437,093 | 3/1984 | Bradley | 340/747 |
| 4,439,760 | 3/1984 | Fleming | 340/799 |
| 4,459,677 | 7/1984 | Porter et al. | 364/900 |
| 4,544,538 | 11/1985 | Bieneman | 340/799 |
| 4,555,755 | 11/1985 | Pike | 364/900 |
| 4,611,202 | 9/1986 | Di Nitto et al. | 340/724 |
| 4,700,181 | 10/1987 | Maine et al. | 340/747 |

FOREIGN PATENT DOCUMENTS

| | | | |
|---|---|---|---|
| 0067302 | 12/1982 | European Pat. Off. | 364/521 |
| 60-117327 | 6/1985 | Japan | 364/521 |

OTHER PUBLICATIONS

Wilkes et al., "The Rainbow Workstation", The Computer Journal, 1984.
Bell et al., "Graphics Controller Chip Does Windows, etc.", Electronic Design, Nov., 1985.
Intel Architectural Specification-82716/VSDD, Video Storage and Display Device.
"Computer Graphics", Electronic Design, 1/20/83, p. 75, (introduction page for articles to follow).
"Computer Graphics—Better Graphics Opens New Windows on CEA Stations", M. Schindler, Electronic Design, 1/20/83, pp. 77–82, 84, 86.
"Computer Graphics—Silicon Support for Video Displays Grows Smarter", D. Bursky, Electronic Design. 1/20/83, pp. 93–98.
"Computer Graphics—Graphics Standards are Emerging, Slowly but Surely", C. Bailey, Electronic Design, 1/20/83, pp. 103–108, 110.
"Computer Graphics—Dedicated VLSI Chip Lightens Graphics Display Design Load", G. DePalma et al., Electronic Design, 1/20/83, pp. 131–136, 138, 139.
"Computer Graphics—μP Architecture Suits Bit--Mapped Graphics", P. Chu et al., Electronic Design, 1/20/83, pp. 143–148, 150, 152.
"Computer Graphics—CRT Controller Chip Displays High Quality Attributes", B. Cayton et al., Electronic Design, 1/20/83, pp/ 157–163.
"Computer Graphics—Graphics Frees Itself from Device Dependence", B. Perry, Electronic Design, 1/20/83, pp. 167–173.
"Computer Graphics—Focus on Graphics Terminals: VLSI Raises Performance", C. Warren, Electronic Design, 1/20/83; pp. 183, 184–190, 192.
B. Artwick, "Microcomputer Displays, etc.", Prentice Hall, 1984, pp. 280–287.
C. McEwan, "Parallel Coprocessors Speed Graphics System", Electronic Design, 5/26/83, pp. 129–135.

*Primary Examiner*—Parshotam S. Lall
*Assistant Examiner*—Brian M. Mattson
*Attorney, Agent, or Firm*—Martin Novack

[57] ABSTRACT

A method and apparatus creates a display of a scene having a plurality of object elements. One or more frame buffers are utilized in creating the display.

17 Claims, 4 Drawing Sheets

GRAPHICS DISPLAY SYSTEM USING FRAME BUFFERS

This invention relates to a novel method and apparatus for producing a video display of highly complex and visually pleasing graphics, particularly but not exclusively including the production of animation, where, through the use of frame buffers, continuity of display is ensured, the handling of additional amounts of data in real time is accomplished, and a considerable amount of updating of stored data during normal display can be accomplished.

Over the past two decades, computers have been pervasive in penetrating many areas of industry, entertainment, defense and art. This increased use and acceptance of computers has generated a need for them to produce accurate and versatile results while at the same time being easy to operate by non-skilled users and involving the use of relatively simplified computer hardware. In no specific area has this need been more apparent than in connection with the production of computer graphics. In the past, images produced by reasonably priced computer systems were in general too crude to be useful in realistic imaging applications and current systems provide only limited animation capability.

A graphics display system which to a large extent satisfied that need is disclosed in U.S. Pat. No. 4,700,181 entitled "Graphics Display System" and assigned to the assignee of this application and herein incorporated by reference. The general history of the art is set forth in that application under the heading "Background of the Invention". The system described in that application represented a significant advance over the prior art, particularly in the ability to select from vast amounts of data the information necessary to produce display images of desired precision and complexity, all within real time, but, as with any system, there was an upper limit on the amount of data which could be thus handled in real time.

The system disclosed in U.S. Pat. No. 4,760,390 entitled "Improved Graphics Display System", also assigned to the assignee of this application and also herein incorporated by reference, resulted from the strong incentive to produce a system which could further push forward the technology for displaying quality images, expanding the amount of data which could be manipulated in real time to produce such images, and further facilitating the ability to animate such images, all while still utilizing commercially practical computer hardware.

The desirability of being able to handle ever more data in real time was always before us. Moreover, it was recognized that in many instances it was not the total amount of data to be handled in real time that was controlling, but that rather the need to handle increasing data detail concentrated in selected portions of the display screen was often a determining factor. Being able to display a limited number of highly precise and complex images in different portions of the screen, thus requiring the application of much data to those limited screen portions, while other portions of the screen could have little or only rudimentary data applied thereto, was often far more important than the total amount of data that had to be handled for the entire screen area. Dealing with the display on a line-by-line basis, as was disclosed in the aforementioned U.S. Patents, did not prove to be optimum in solving this particular problem.

In addition, in most display systems the stored data must from time to time, and sometimes quite frequently, be revised or updated. This can be done by providing the new or revised data from an external fixed data source such as tapes, cassettes, or optical or magnetic discs, or that new data may be provided on a "live" basis, as from a video camera or by a "painting" operation. The system of U.S. Pat. No. 4,760,390 had some capability for permitting stored data revision while display was going on, but that capability was limited by the time required to construct the images in the construction/display buffers. Only the excess of the total available construction time over the construction time actually needed could be used for memory updating. If more updating time than that was required, only a partial image construction was possible, and that is obviously undesirable.

The enhanced capability of the system of the present invention significantly expands the potentialities of a graphic system, including the systems of the aforementioned patents, particularly in terms of manipulation of data in order to create a scene and change it, all within the time constraint of a full motion video display system such as a CRT monitor or a TV set.

As used in this specification and in the claims, "real time" refers to the time required by a full motion video display system, such as one meeting standards of the National Television Standards Committee, to provide commercially acceptable representations of motion. Typical of such display systems are CRT monitors, TV receivers and the like. The system of the present invention produces instant interactive images within the time required to scan a frame of the display system, and can sustain those images indefinitely. Thus, designed with speed in mind, this system is capable of producing lifelike animation for domestic television sets or monitors. This animation can be made up of entirely computer generated shapes or pictures scanned into the host computer with a video camera, tape, disc or other graphic system. In either case, the resolution provided is far better than what current low cost computer video systems provide.

It is a prime object of the present invention to provide a graphics display system in which an increased amount of data can be handled in real time, particularly with respect to selected portions of the display where greater display detail or animation is desired.

It is another prime object of the present invention to provide a display system in which display continuity is assured even though extensive stored data revision is taking place.

It is a further prime object of the present invention to organize the display system so that a very substantial amount of stored data revision can take place without interfering with the continuity of changeable or animated displays, even to the extent of enabling the new stored data to be introduced from a "live" source such as a TV camera without interrupting the continuity of the dynamic display.

The objects set forth are accomplished through the use in particular ways of frame buffers, either in place of or in addition to the line buffers specifically disclosed in the aforementioned U.S. Patents, for construction and display purposes. (By "line buffers" is meant a buffer with a capacity corresponding to one or more lines, but fewer lines than an entire frame.) In perhaps the simplest embodiment, a full frame buffer is employed, fed by the line buffers and retaining within itself the data for the last-constructed scene produced by those line buffers. Should those line buffers temporarily become inoperative because memory is being updated and therefore is not available for access by the buffers, the frame buffer will produce a scene on the display screen. That scene will be static, not dynamic, but that is much more acceptable than if the screen were to go blank.

In more sophisticated embodiments, the line buffers of our previous applications are supplanted by frame buffers. This has several advantages. One is that it eliminates the necessity for "painting" on a line-by-line basis, which is essentially uneconomic from a time viewpoint, and permits the painter to operate object by object, a much more efficient use of the "painter's" time, thus increasing the amount of data that can be handled in real time. Another is that particular objects can be displayed with considerably more detail than was possible with our previous systems. Yet another is that the frame buffers can also provide for a static display if access to the memories is cut off, as when the latter are being recharged with data.

Separate frame buffers can be provided for the odd and even lines respectively of the display, those separate frame buffers alternately functioning as construction buffers or display buffers analogously to the alternate construction/display functioning of the line buffers of the aforementioned U.S. Patents. An even more advantageous arrangement is to utilize separate full frame buffers for alternate construction and display modes. This arrangement has the advantage that since each of these buffers is constructed in one frame time and will then provide display data for two frame times, one for the odd lines and the other for the even lines, the non-displaying memory unit can be made available to an external data source for updating or revision during one of those frame times. Hence, continuous variable and animated displays can be produced while at the same time allocating half of the total time to the external data source, which in that case can be a "live" source, such as a TV camera.

To the accomplishment of the above, and to such other objects as may hereinafter appear, the present invention relates to a system (method and apparatus) for forming a graphics display, as defined in the appended claims, and as described in this specification, taken together with the accompanying drawings, in which:

Figure 1:
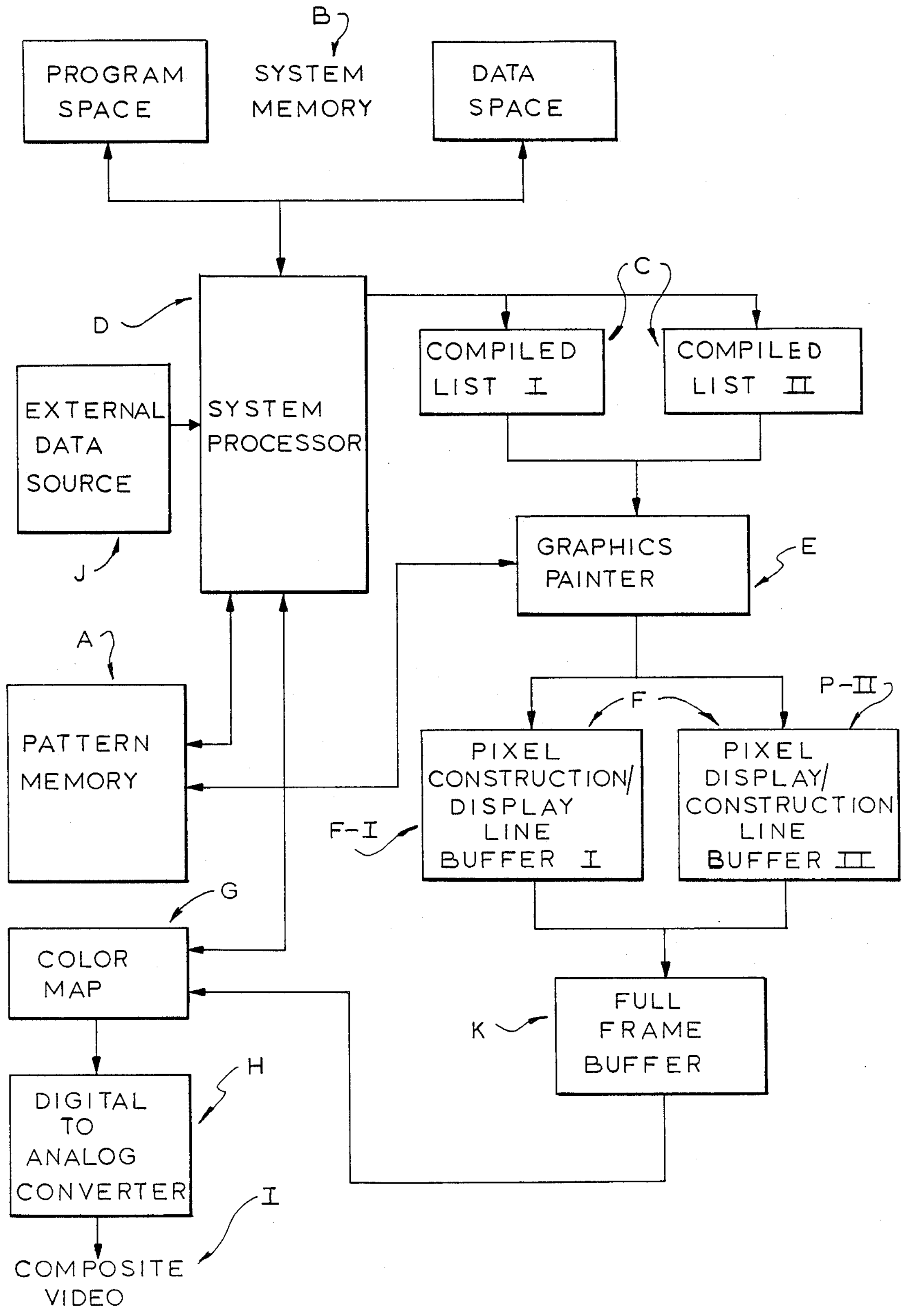
FIG. 1 is a block diagram of a first embodiment of the present invention.

All of the systems here disclosed are similar to those of U.S. Pat. No. 4,760,390 in utilizing a pattern memory A, a system memory B, a third memory component C, a system processor D, a graphics painter E, buffers F used for construction and display, a color map G, and a digital to analog converter H, from which a composite video signal I goes to the display instrumentality. The interaction between those elements is set forth in considerable detail in the aforementioned U.S. Pat. No. 4,760,390, here incorporated by reference. Briefly, the pattern memory A receives and stores data, usually in the form of a bit map, defining the appearance of those object elements which, it is expected, will be displayed over a period of time, although in most instances not all of those elements will be displayed at any given moment. The system memory B may contain program instructions and will also contain data, preferably in the form of linked lists of the type generally described in U.S. Pat. No. 4,700,181, identifying various components of a desired display and containing display instructions relative thereto. This data stored in the system memory B relates to all portions of the display which are to be formed throughout the period of operation of the system, and is not limited to the data needed for a display at any particular moment. A data processing unit, generally designated D and here called the "system processor", functions before a display run is commenced to deposit the appropriate data in the pattern memory A and the system memory B, obtaining that data from some external source J, and the system processor D is also used to revise or update the data in pattern memory A and/or system memory B in accordance with instructions and data either internally stored or received from the external data source J while the system is operating to produce displays. The system processor D further loads color information into the color map memory G.

When the system produces a display from the data stored in memories A, B and G, the system processor D reads from the linked lists of system memory B that identification and display instruction data relevant to creating a display at a particular moment, and it deposits that data into the third memory component C. That which is deposited will hereafter be termed "the compiled list", which may well be in the form of a sequential list, and hence the memory component C is termed "the compiled list memory C". The compiled list represents the object element identification and relevant display instructions for a particular instantaneous display, this being usually only a small proportion of the corresponding data stored in memories A and B.

A separate data processing unit generally designated E, and hereinafter termed the "graphics painter", addresses the identification and instruction data stored at any given moment in the compiled list C and, for each object element identified in the compiled list C, reads from the pattern memory A the data defining the appearance of that object element and then, in accordance with the display instructions for that object element stored in the compiled list C, the graphics painter E produces display data which it feeds to the two alternately acting display/construction buffers generally designated F, which as here specifically disclosed, correspond to the alternately acting buffers 16 and 18 of U.S. Pat. No. 4,700,181 and the alternately acting buffers F-I and F-II of U.S. Pat. No. 4,760,390.

As in the aforementioned patents, the output from the construction/display buffers F goes to the color map G, into which appropriate data had previously been stored by the system processor D, and from there the display data goes to digital to analog converter H, from which a composite video signal I goes to the display instrumentality, all in well known manner, and for example as described more in detail in U.S. Pat. No. 4,700,181.

Two compiled lists C-I and C-II may be provided, each of which may contain the appropriate identification and display instruction data for a given line, group of lines, or frame. When one of the compiled lists C-I or C-II is being accessed by the graphics painter E in order to produce display data for one line or frame, the list for the next line or frame is being constructed by the system processor D in the other compiled list C-II or C-I.

In the above-described system, a display can be produced only so long as the line buffers F have access, via the graphics painter E, to the pattern memory A, since it is only with such access that the display lines can be constructed in the buffers F. Whenever the pattern memory A has to be available to other sources, formation of a display must cease. This greatly restricts the capability of the system to function while at the same time permitting updating of the pattern memory A. Yet it is often necessary to revise or update the contents of pattern memory A (and also system memory B) to an extent such as to be impossible to accomplish within real time constraints. When that occurs, the display screen goes blank. That may occur for only a fraction of a second or for many seconds, depending upon the extent to which the contents of pattern memory A are changed, but such blanking of the display is undesirable in any event.

The embodiment of FIG. 1 avoids this disadvantage by interposing between the construction/display line buffers F and the color map G a frame buffer K. The lines constructed by the line buffers F are in turn constructed in the frame buffer K, where they remain until modified, and the line-by-line data is fed from frame buffer K to the composite video signal I in any appropriate known manner. Thus, if for any reason construction of new lines in the line buffers F is interrupted—for example, because the pattern memory A is being updated and hence access thereto by the graphics painter E has been interrupted—the frame buffer K ensures that a scene is still displayed. That scene is static because no changes are being made in any of the lines stored in the frame buffer K, but a static scene is infinitely preferable to no scene at all.

A second limitation in the functioning of the systems of our two prior applications is that construction is accomplished on a line-by-line basis. As a result the total number of objects that can be supported by the system is limited by the "highest band width" line. In addition, the entire object list in system memory B is traversed for each line to be constructed although a good portion of that list will be irrelevant to the particular line under construction. This results in a significant waste of operating time. Both of these factors significantly adversely affect the amount of data that can be handled by the system in real time and tend to limit the degree of detail with which particular objects can be displayed.

Figure 2:
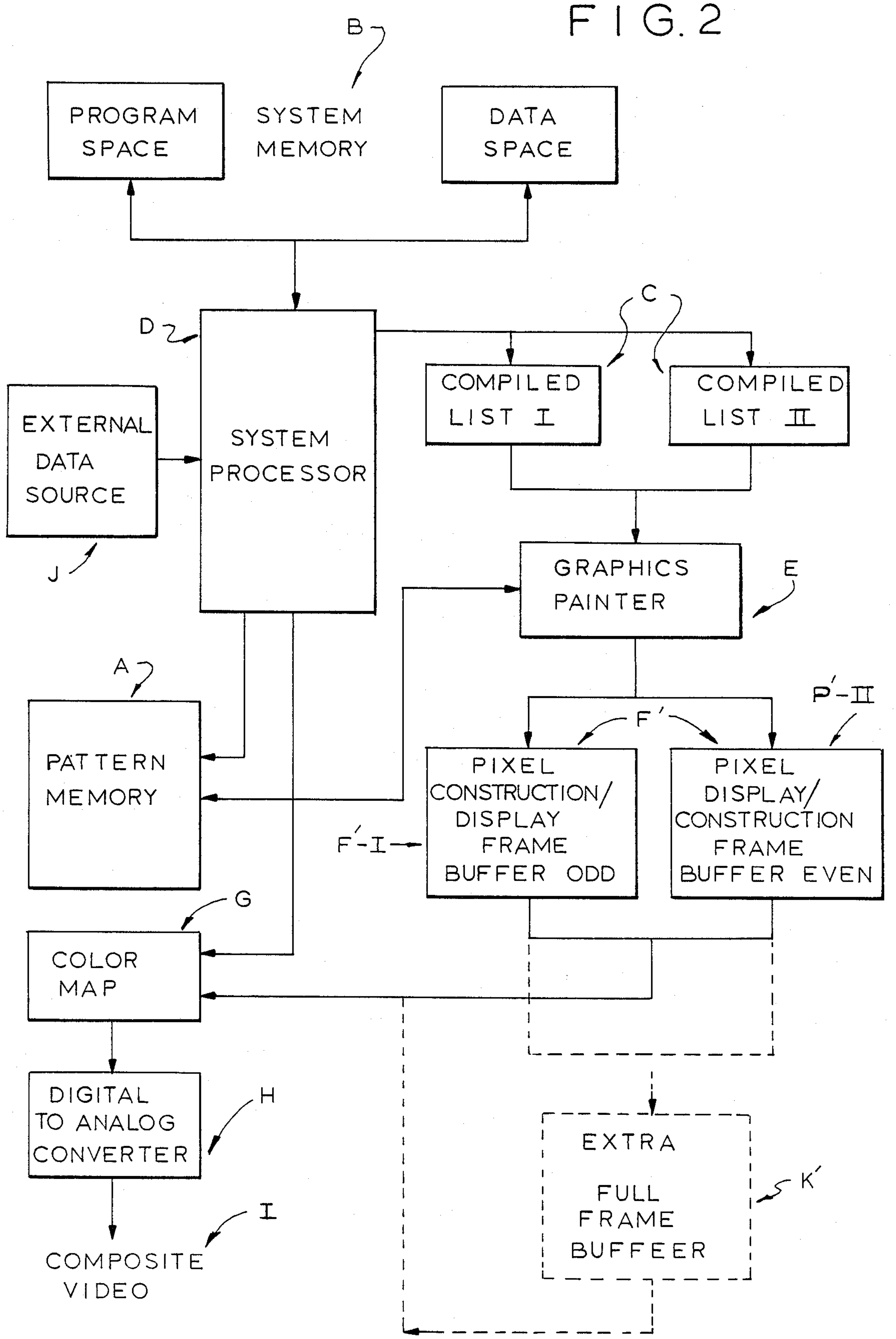
FIG. 2 is a block diagram of a second embodiment of the present invention.

To overcome this disadvantage, the embodiment of FIG. 2 substitutes frame buffers F′ for the line buffers F of the embodiment of FIG. 1. In that embodiment, each of the frame buffers F′ will accommodate half of the total frame, the buffer F′-I being adapted to contain the odd lines of the frame and the buffer F′-II being adapted to contain the even lines of the frame (it is conventional, in making up a display on a screen, to first sequentially display the odd lines of the frame and then to sequentially display the even lines thereof).

This use of frame buffers F′ rather than line buffers F results in a significant overall improvement in the operation of the system. In the first place, since the display no longer need be constructed on a line-by-line basis, each object can be constructed in a given frame buffer F′ in its entirety. Hence, the "highest band width" line no longer presents a limitation, and the construction time of the various objects to be represented in a display can be averaged over a given frame time, thus enabling certain objects to be displayed in greater detail than had been previously possible, and permitting an increase of perhaps a full order of magnitude in the number of objects that can be displayed. In addition, because the display can now be constructed in the buffers F′ on an object-by-object basis, considerable time can be saved in accessing relevant portions of the pattern memory A.

Moreover, because the two buffers F′-I and F′-II contain data for a complete display, if access to the pattern memory A by the graphics painter E is interrupted, as described above, a static display can be produced by the buffers F′-I and F′-II. Hence, there need be no blanking of the display screen even when extensive updating of pattern memory A from the external source J takes place.

The broken lines in FIG. 2 show an optional modification of the system there disclosed. Instead of having the frame buffers F′-I and F′-II feed directly to the color map G, they can be caused to feed to an extra full frame buffer K′, which in turn feeds the color map G. This extra full frame buffer K′ is not needed to prevent blanking of the display when the pattern memory A is not available; the frame buffers F′-I and F′-II accomplish that, as has been described. The function of the extra frame buffer K′ is to reduce the time that the display must be static by making the buffers F′-I and F′-II available to be used for construction while the buffer K′ ensures continuity of static display, and also enables the buffers F′ to be accessed by a third source, such as a TV camera, while continuity of the static display is ensured.

Figure 3:
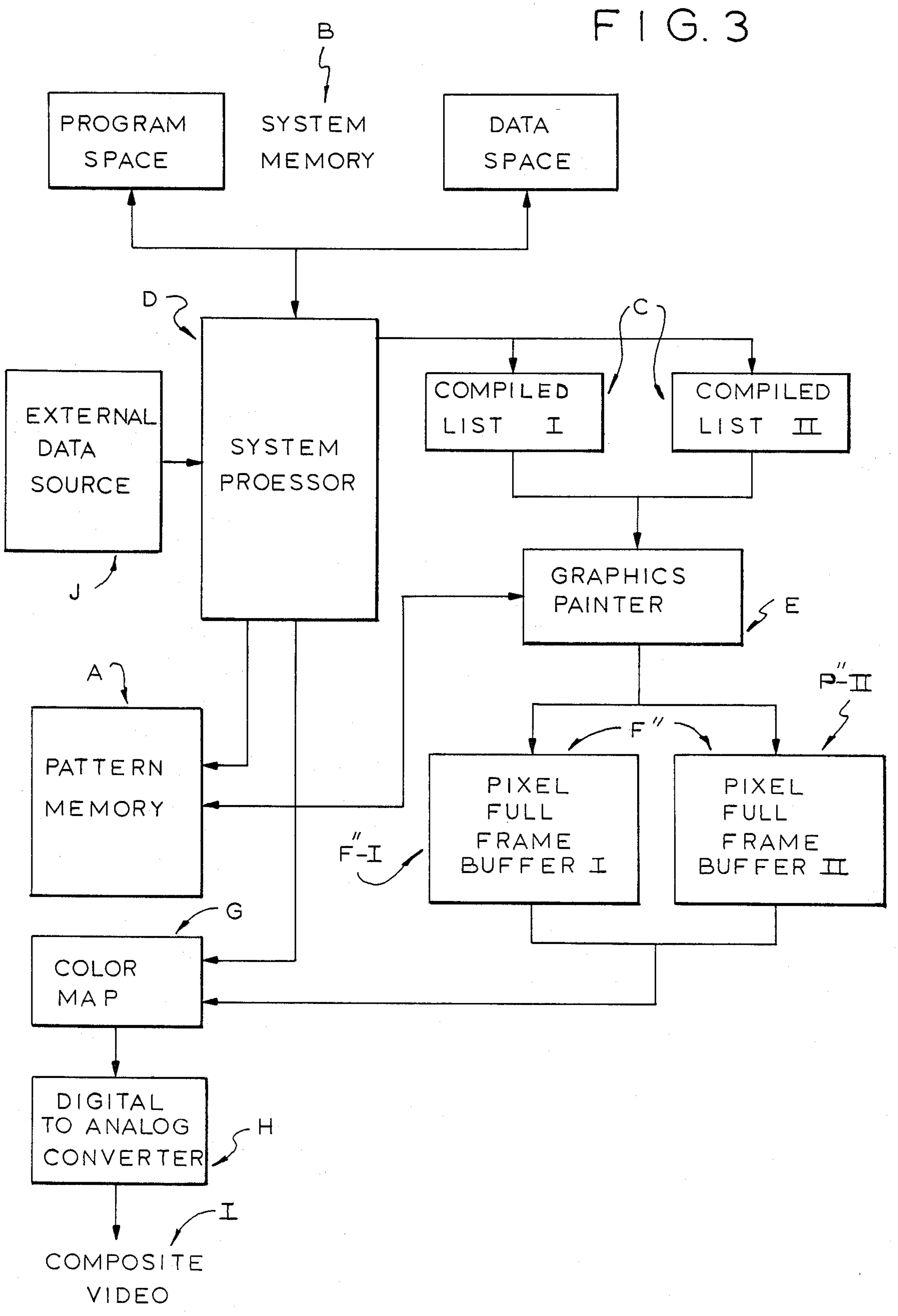
FIG. 3 is a block diagram of a third embodiment of the present invention.
Figure 4:
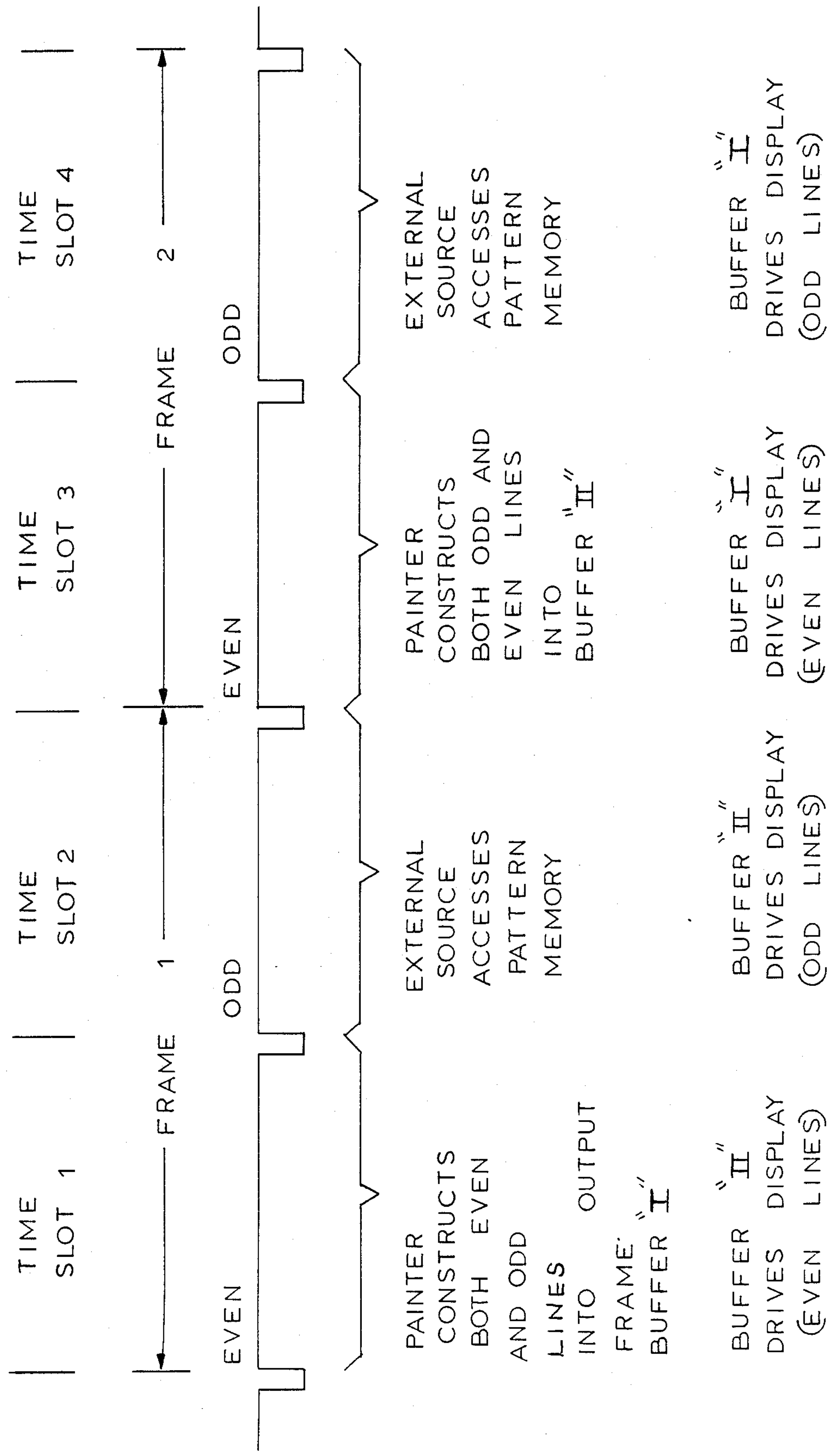
FIG. 4 is a time chart showing the performance of various functions by the embodiment of FIG. 3.

The embodiment of FIG. 3 is similar to the embodiment of FIG. 2 except that the construction/display buffers F″ are each full frame buffers having the capacity to store data for both the odd lines and the even lines of the display. With this arrangement, considerably greater leeway in updating or changing pattern memory A from an external data source J is possible, as is indicated by the timing chart of FIG. 4. That chart discloses four time slots, each typically representing the time required to display either the odd or even lines of a display, two such time slots of 1/60th of a second each making up the conventional frame time of 1/30th of a second. A first frame is displayed in time slots 1 and 2; a second frame is displayed in time slots 3 and 4, and so on.

In the first time slot, the painter E constructs a frame in buffer F″-I, an earlier frame having been previously constructed in buffer F″-II. In that same time slot, the even lines of the display are produced from the appropriate data in buffer F″-II.

In the second time slot, the odd lines of the display are produced from buffer F″-II, but since the next frame has already been constructed in buffer F″-I, nothing more need be done with respect to that buffer. Hence, the time of that second time slot is now available for the external data source J to update the data in pattern memory A via the system processor D. The graphics painter E is prevented from having access to the pattern memory A during that second time slot, but it does not need that access.

In the third time slot, the graphics painter E is again given access to the pattern memory A and constructs the next frame in frame buffer F″-II, and in the same time slot, the even lines of the display are produced from the appropriate data in buffer F″-I.

In the fourth time slot, the odd lines of the display are produced from the appropriate data in buffer F″-I, but because buffer F″-II has already been completely constructed, the time of this time slot is available for updating of pattern memory A.

Alternatively, the system of FIG. 3 could be employed in conjunction with a "live" data source such as a TV camera, to construct one frame buffer F″-I from data provided by the graphics painter E and construct the other frame buffer F″-II from data provided by the "live" data source.

The embodiment of FIG. 3 could, if desired, be provided with the extra full frame buffer K′ of FIG. 2 to produce the results previously set forth above.

As will be appreciated from the above explanation, the data handling capacities and flexibility of use of the systems of the two aforementioned patents, and particularly the system of U.S. Pat. No. 4,760,390, have been significantly enhanced by the system modifications here disclosed. It will be apparent that many variations may be made in the embodiments here set forth, all within the spirit of the invention as defined in the following claims.

We claim:

1. A method for creating on a display screen field of a scanning display device a representation of a scene comprising a plurality of object elements, said method comprising:

A. storing first memory data corresponding to said plurality of object elements;

B. storing second memory data identifying said plurality of object elements together with instructions as to the nature and location of representations of said object elements;

C. creating, from said second memory data, third memory data corresponding to identification and desired instructions with respect to selected ones of said plurality of object elements;

D. creating, from said first memory data and in conformity with said third memory data, display data corresponding to the representations of said selected object elements in said scene;

E. utilizing a frame buffer memory capable of constructing from said display data a scene for said display screen and depositing display data into said frame buffer memory;

F. causing the display data in said frame buffer memory to produce a display on said screen; and G. performing steps D, E and F in real time relative to the scanning time of said display device.

2. The method of claim 1, in which step E comprises utilizing two frame buffer memories each capable of constructing from said display data a scene for different portions of said display screen, depositing the appropriate display data into a first of said frame buffer memories to construct its scene portion and then depositing the appropriate display data into the second of said frame buffer memories to construct its scene portion, and repeating said depositing steps, and in which step F comprises utilizing the display data in a given frame buffer memory while the other frame buffer memory is having display data deposited thereinto.

3. The method of claim 2, in which each of said frame buffer memories is capable of constructing a different half of said scene.

4. In the method of claim 3, utilizing an additional buffer memory capable of constructing an entire display screen scene, and H. depositing in said additional buffer memory, display data corresponding to a particular scene, and I. upon command, causing the display data in said additional buffer memory to produce the display on said screen.

5. The method of claim 2, in which said display comprises a plurality of lines, and in which said first and second frame buffer memories construct the odd and even numbered lines of said display scene respectively.

6. In the method of claim 2, utilizing an additional buffer memory capable of constructing an entire display screen scene, and H. depositing in said additional buffer memory, display data corresponding to a particular scene, and I. upon command, causing the display data in said additional buffer memory to produce the display on said screen.

7. The method of claim 6, in which the display data deposited in said additional buffer memory corresponds to the scene being displayed immediately prior to said command.

8. The method of claim 1, in which step E comprises utilizing two frame buffer memories each capable of constructing from said display data a scene for said display screen and depositing the appropriate display data into a first of said frame buffer memories to construct its scene and then depositing the appropriate display data into the second of said frame buffer memories to construct its scene, and repeating said depositing steps.

9. In the method of claim 8, in combination with an external data source, in a first period of time depositing the appropriate display data into a first of said frame buffer memories while the display data in said second frame buffer memory produces a display on said screen, in a second period of time controlling said external source to modify said first memory data or said second memory data while said second frame buffer memory produces a display on said screen, in a third period of time depositing the appropriate display data into the second of said frame buffer memories while the display data in the first of said frame buffer memories produces a display on said screen, in a fourth period of time controlling said external source to modify said first memory data or said second memory data while the display data in said first frame buffer memory produces a display on said screen.

10. Apparatus for creating on a display screen of a display device a representation of a scene comprising selected ones of a plurality of object elements, said apparatus comprising:

A. a pattern memory for storing data representing a plurality of object elements;

B. a system memory for storing data identifying said plurality of object elements and data comprising instructions defining the nature and location of representations of said object elements;

C. a third memory for storing instructions as to the identity, nature and location of display of desired ones of said object elements;

D. two frame buffer memories each capable of constructing, from display data that is created from the data stored in the pattern memory and is in conformance with the instructions stored in said third memory, a scene for different portions of said display screen;

E. first data processing means operatively connected between said system memory, said pattern memory and said third memory for transferring data therebetween;

F. second data processing means operatively connected between said third memory, said pattern memory and said frame buffer memories for depositing display data into a first of said frame buffer memories and then depositing display data into the second of said frame buffer memories, in response to instructions from said third memory, and G. display means for causing said data in said frame buffer memories to produce a display on said screen corresponding to said representation of a scene.

11. The apparatus of claim 10, in which each of said frame buffer memories is capable of constructing a different half of said scene.

12. In the apparatus of claim 11, an additional buffer memory capable of constructing an entire display screen frame, data processing means operatively connected between said third memory, said pattern memory and said additional buffer memory for depositing in said additional buffer memory display data corresponding to a particular scene; and means active, on command, to control the display data in said additional buffer memory to produce the display on said screen.

13. The apparatus of claim 10, in which said display means comprises a plurality of lines, and in which said first and second frame buffer memories construct the odd and even numbered lines of said display scene respectively.

14. In the apparatus of claim 10, an additional buffer memory capable of constructing an entire display screen frame, data processing means operatively connected between said third memory, said pattern memory and said additional buffer memory for depositing in said additional buffer memory display data corresponding to a particular scene; and means active, on command, to control the display data in said additional buffer memory to produce the display on said screen.

15. The apparatus of claim 14, in which the display data deposited in said additional buffer memory corresponds to the scene being displayed immediately prior to said command.

16. Apparatus for creating on a display screen of a display device a representation of a scene comprising selected ones of a plurality of object elements, said apparatus comprising:

A. a pattern memory for storing data representing a plurality of object elements;

B. a system memory for storing data identifying said plurality of object elements and data comprising instructions defining the nature and location of representations of said object elements or parts thereof;

C. a third memory for storing instructions as to the identity, nature and location of display of desired ones of said object elements;

D. two frame buffer memories each capable of constructing, from display data that is created from the data stored in the pattern memory and is in conformance with the instructions stored in said third memory, a scene for said display screen;

E. first data processing means operatively connected between said system memory, said pattern memory and said third memory for transferring data therebetween;

F. second data processing means operatively connected between said third memory, said pattern memory and said frame buffer memories for depositing display data into a first of said frame buffer memories to construct a scene and then depositing display data into the second of said frame buffer memories to construct a scene, in response to instructions from said third memory; and G. display means for causing said data in said frame buffer means to produce a display on said screen corresponding to said representation of a scene.

17. In the apparatus of claim 16, an external data source, means operatively connected between said external data source and at least one of said pattern memory and said system memory for transferring data from said external data source to said at least one of said memories, and control means operative in a first period of time to deposit appropriate display data into a first of said frame buffer memories while the display data in said second frame buffer memory produces a display on said screen, in a second period of time controlling said external source to modify data in said pattern memory or said system memory while said second frame buffer memory produces a display on said screen, in a third period of time depositing the appropriate display data into the second of said frame buffer memories while the display data in the first of said frame buffer memories produces a display on said screen, in a fourth period of time controlling said external source to modify data in said pattern memory or said system memory while the display data in said first frame buffer memory produces a display on said screen.

* * * * *